A. H. BIEKER.
COMBINED AIR VALVE AND FILLER PLUG.
APPLICATION FILED NOV. 5, 1917.

1,319,136. Patented Oct. 21, 1919.

Inventor
Anthony H. Bieker
By Lancaster and Allwine
his
Attorneys

UNITED STATES PATENT OFFICE.

ANTHONY HENRY BIEKER, OF ALLAN, SASKATCHEWAN, CANADA.

COMBINED AIR-VALVE AND FILLER-PLUG.

1,319,136.  Specification of Letters Patent.  Patented Oct. 21, 1919.

Application filed November 5, 1917. Serial No. 200,468.

*To all whom it may concern:*

Be it known that I, ANTHONY H. BIEKER, a citizen of Canada, and a resident of Allan, in the Province of Saskatchewan and Dominion of Canada, have invented certain new and useful Improvements in Combined Air-Valves and Filler-Plugs, of which the following is a specification.

The present invention relates to filler plugs, and has for an object to provide an improved type of plug embodying air valve features wherein not only may a receptacle be filled with gasolene or the like, for supplying tanks, portable lights, lanterns and such devices with fluid, but which also admits of the introduction of air under pressure to the container to which the plug is applied.

Another object of the present invention is to provide a combined air valve and filler plug which embodies a unitary structure; which embodies but relatively few parts; which is provided with a plug retracting stem formed to provide a controlling valve, and air pressure connection; and a device which embodies a plug coöperating with the stem and having a valve and novel means for fitting the plug securely in the nipple of the device.

The above, and various other objects and advantages of this invention will be in part described, and in part understood, from the following detailed description of the present preferred embodiment, the same being illustrated in the accompanying drawing, wherein:—

Figure 1:
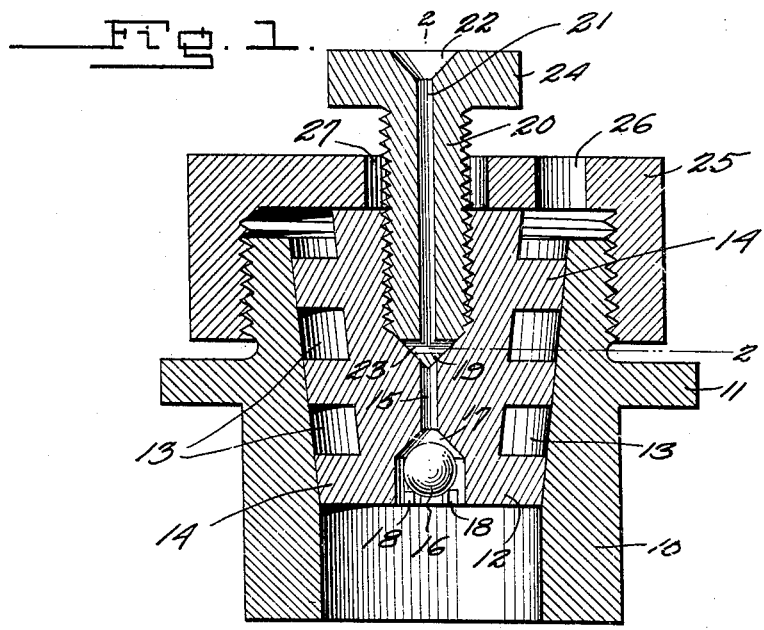
Figure 1 is a longitudinal central section taken through a combined air valve and filler plug constructed according to the present invention.
Figure 2:
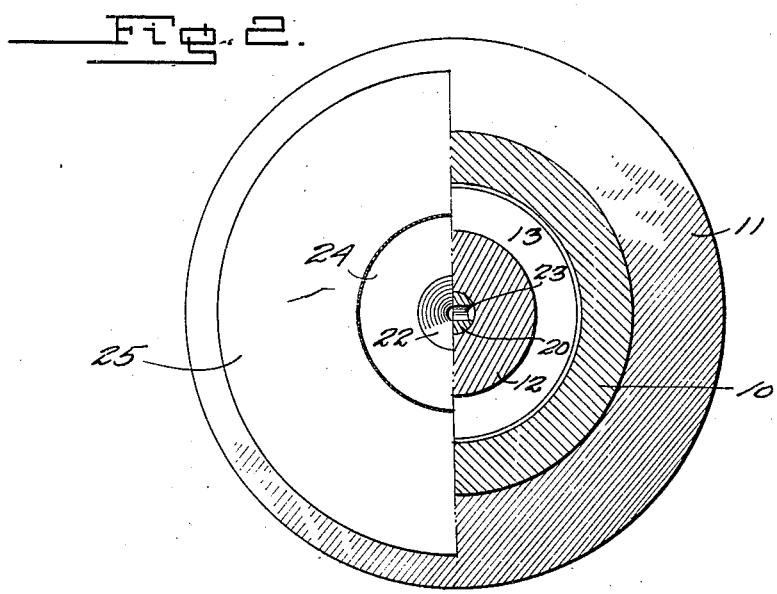
Fig. 2 is a top plan view of the same, partly in section on the line 2—2 of Fig. 1.

Referring to this drawing, 10 designates a nipple or neck which may be secured through the wall of a receptacle, such as a tank, and which is provided intermediate its ends with an annular outstanding flange 11 adapted to engage the exterior surface of the container. The opposite or outer end of the nipple 10 is externally screw-threaded. The nipple 10 is provided with an inwardly tapering bore in which is fitted a plug 12 correspondingly tapered and adapted to close the passage through the nipple. The plug 12 is preferably formed with a plurality of annular grooves or recesses 13, in its exterior surface forming, between the grooves 13, annular ribs 14 the peripheral surfaces of which are inclined or beveled to conform to the taper of the plug and are adapted to independently bind against the inner wall of the nipple 10 to insure the fitting of the plug in the nipple.

The plug 12 is provided with an axial opening 15 counter-bored at its lower end to form a valve chamber in which a ball valve 16 is mounted, the ball valve being adapted to engage the seat 17 formed at the bottom of the counter-bore. Lugs 18 are formed in the lower end of the counter-bore to retain the ball 16 in place and to admit of the relatively slight vibration of the ball toward and from its seat 17.

The upper end of the plug 12 is also provided with an internally threaded counter-bore forming a valve seat 19 at the outer end of the axial opening 15, and a valve stem 20 is threaded in the upper counter-bore and is suitably tapered at its lower end to fit against the seat 17. The stem 20 is provided with a longitudinal passage 21 therethrough which opens at its outer end into a depression or seat 22 formed in the outer end of the stem, and which terminates at its inner end in a transversely extending way 23 formed in the tapering inner end of the stem.

The stem 20 is provided upon its outer end with a relatively large head 24 beneath which is placed a closure cap 25, the latter having screw-threaded engagement with the upper end of the nipple 10. The stem 20 is of such length that when the stem is seated against the valve seat 19, the cap 25 is permitted a limited free play between the head 24 and the upper end of the plug 12. The cap 25 is provided eccentrically with a vent opening 26 lying beyond the outer marginal edge of the plug 12 to admit the ingress and egress of air to and from the cap as the latter is adjusted. The cap 25 is also provided with a central unthreaded opening 27 relatively large as compared with the diameter of the stem 20 to admit of the free movement of the latter through the opening 27 and being relatively small as compared with the diameter of the head 24 to engage the latter against the upper or outer surface of the cap 25 when the latter is turned outwardly upon the nipple.

In use, when the cap 25 is assembled upon the stem 20 and the plug 12, the latter may be inserted in the outer end of the nipple 10 and the cap 25 turned inwardly over the nipple. The top of the cap engages the outer end of the plug 12 and forces the latter into the tapering bore of the nipple to bind the plug therein and securely seal the same. Pressure within the container to which the nipple is attached raises the ball valve 16 to its seat 17 and prevents the escape of air or gas from the container. Should the ball valve 16 leak, which frequently occurs, the stem 20 when seated against the shoulder 19 insures the sealing of the plug and consequently the maintaining of the fluid pressure within the container. When it is desired to increase the air or gas pressure within the container, it is only necessary to apply a nozzle or pump to the seat 22 of the stem 20 when the latter is backed upwardly or outwardly from the valve seat 19 to a sufficient extent to open the transverse passage 23. Air or gas pressure is then delivered to the stem 20 and the air or gas under pressure unseat the valve 16 and enters the container. The valve 16 automatically closes when the external pressure is released and the stem 20 may then be turned down to its valve seat 19 to maintain the pressure in the container.

In removing the plug 12 from the nipple 10, it is only necessary to unscrew the cap 25 and remove the latter outwardly on the nipple 10. As soon as the cap 25 strikes the head 24 of the stem the latter together with the plug 12 is withdrawn from the nipple and the latter is opened. The stem holds the plug 12 and the cap 25 together at all times and does not interfere with any adjustment of the stem 20 when the plug 12 is in position in the nipple. It is of course understood that the device may be used in various combinations, the important features of the invention residing in the peculiar construction of certain of the parts to perform the dual function required of the parts in acting as an air valve and also as a filler plug.

It is of course understood that various changes and modifications may be made in the details of construction and design of the above specifically described parts of this invention without departing from the spirit thereof, such changes and modifications being restricted only by the scope of the following claims.

What is claimed is:

1. In a combined air valve and filler plug, the combination, of a nipple having a tapering bore, a tapering plug adapted to fit in the bore and having an axial opening therethrough and a screw-threaded counter bore at its outer end and forming a valve seat, a valve stem threaded in the counter bore and adapted to be turned against said seat for closing the axial opening, said stem having a longitudinal passage therethrough communicating at its lower end with a transverse passage opening into the counter-bore when stem is unseated, an enlarged head on the outer end of said stem, a cap threaded on the outer end of the nipple and having a relatively large central opening for the free passage of the stem therethrough whereby said cap may be forced against said head to unseat said plug, said plug provided with a plurality of annular recesses forming ribs about its outer surface adapted to independently bind against the inner wall of the nipple.

2. In a combined air valve and filler plug, the combination, of a nipple having a tapering bore, a tapering plug adapted to fit in the bore and having an axial opening therethrough and a screw-threaded counter bore at its outer end and forming a valve seat, a valve stem threaded in the counter bore and adapted to be turned against said seat for closing the axial opening, said stem having a longitudinal passage therethrough communicating at its lower end with a transverse passage opening into the counter-bore when stem is unseated, an enlarged head on the outer end of said stem, a cap threaded on the outer end of the nipple and having a relatively large central opening for the free passage of the stem therethrough whereby said cap may be forced against said head to unseat said plug, said plug provided with a plurality of annular recesses forming ribs about its outer surface adapted to independently bind against the inner wall of the nipple, said plug provided with a counter-bore extending upwardly therein from its lower end and forming a valve seat, a valve in said last mentioned outer bore for preventing the egress of fluid through the axial opening in the stem and plug.

ANTHONY HENRY BIEKER.

Copies of this patent may be obtained for five cents each, by addressing the "Commissioner of Patents, Washington, D. C."